US012716727B2

(12) United States Patent
Han

(10) Patent No.: US 12,716,727 B2
(45) Date of Patent: Aug. 25, 2026

(54) DRONE DEVICE FOR SHIP NAVIGATION GUIDANCE AND DRIVING METHOD THEREOF

(71) Applicant: Sungjin Han, Incheon (KR)

(72) Inventor: Sungjin Han, Incheon (KR)

(*) Notice: Subject to any disclaimer, the term of this patent is extended or adjusted under 35 U.S.C. 154(b) by 0 days.

(21) Appl. No.: 18/824,855

(22) Filed: Sep. 4, 2024

(65) Prior Publication Data

US 2025/0020469 A1 Jan. 16, 2025

(30) Foreign Application Priority Data

Jul. 5, 2023 (KR) ........................ 10-2023-0087353

(51) Int. Cl.
*G01C 21/20* (2006.01)
*G01S 17/93* (2020.01)

(52) U.S. Cl.
CPC .............. *G01C 21/20* (2013.01); *G01S 17/93* (2013.01)

(58) Field of Classification Search
CPC ................................ G01C 21/20; G01S 17/93
See application file for complete search history.

(56) References Cited

U.S. PATENT DOCUMENTS

2021/0114698 A1* 4/2021 Moon ..................... G08G 3/02

FOREIGN PATENT DOCUMENTS

| | | | | | |
|---|---|---|---|---|---|
| CN | 119296381 | A | * | 1/2025 | G08G 3/02 |
| JP | 2018-152106 | A | | 9/2018 | |
| JP | 2019-036010 | A | | 3/2019 | |
| KR | 10-2017-0004560 | A | | 1/2017 | |
| KR | 10-2019-0059083 | A | | 5/2019 | |
| KR | 102007849 | B1 | * | 8/2019 | G08G 5/0073 |
| KR | 10-2021-0039791 | A | | 4/2021 | |
| KR | 10-2021-0075647 | A | | 6/2021 | |
| KR | 10-2327807 | B1 | | 11/2021 | |
| KR | 10-2340589 | B1 | | 12/2021 | |
| KR | 10-2022-0130629 | A | | 9/2022 | |
| KR | 10-2022-0155559 | A | | 11/2022 | |

OTHER PUBLICATIONS

English Machine Translation of KR-102007849-B1 (Year: 2019).*
English Machine Translation CN-119296381-A (Year: 2025).*

* cited by examiner

*Primary Examiner* — Andrew J Cromer
(74) *Attorney, Agent, or Firm* — Revolution IP, PLLC

(57) ABSTRACT

The present invention relates to a drone device for ship navigation guidance and a driving method thereof, and a drone device for ship navigation guidance according to an embodiment of the present invention may include a data collector configured to collect data relating to a marine environment on a planned sea route along which a designated ship navigates, and a controller configured to perform learning of objects in the marine environment by applying an artificial intelligence (AI) program, analyze the (pre-) collected data based on a result of the learning to determine whether the objects are obstacles as a result of analyzing the data, and when the objects are determined as obstacles, further determine whether the obstacles are fixed obstacles or floating obstacles, and send analysis data to the ship.

4 Claims, 6 Drawing Sheets

DRONE DEVICE FOR SHIP NAVIGATION GUIDANCE AND DRIVING METHOD THEREOF

BACKGROUND OF THE INVENTION

The present invention relates to a drone device for ship navigation guidance and a driving method thereof, and more particularly, to a drone device for ship navigation guidance and a driving method thereof that can acquire information of obstacles present on a planned sea route of a ship using, for example, a light detection and ranging (LiDAR) device mounted on a drone and provide the acquired information to the navigating ship in advance, can apply artificial intelligence (AI) to images of fishing buoys, marine litter, dangerous objects, or the like and classify the images through learning in order to determine the types of the obstacles, an expected movement path, or the like, and can analyze a marine environment such as a tidal current direction through statistical data or real-time data of regional tidal current and provide the analyzed marine environment to the ship.

The International Maritime Organization (IMO) requires that ships be equipped with recorders similar to "black box" flight recorders for aircraft to ensure the Safety of Life at Sea (SOLAS) and also mandates or stipulates that various pieces of safety equipment be mounted for the safe operation of ships. As a safety-related system mounted on a ship, various equipment such as a voyage data recorder (VDR), an automatic identification system (AIS) of ships, and an anti-pirate system is used.

Large ships perform electronic navigation using the Electronic Chart Display and Information System (ECDIS) of the system for safe operation of ships of the IMO and the International Hydrographic Office (IHO), as a cutting-edge operation technique replacing paper charts. The ECDIS is relatively expensive operation equipment and is a system that the IMO and the IHO recommend be installed together with paper charts when embedded in ships. Also, the ECDIS provides functions such as own-ship positioning and sea route setting, obstacle warning, radar linkage, automatic navigation, track management, and remote electronic chart update using the Global Positioning System (GPS) or the Global Navigation Satellite System (GNSS) while displaying an electronic chart on a monitor. In order to update data, manual or semi-automatic data update using maritime satellites should be performed, and users should always check whether an electronic chart matching their sea route is embedded. It is also necessary to check whether the electronic chart is updated, and if an update is required, the update should be performed manually or semi-automatically in an appropriate manner to ensure safe navigation.

Conventionally, there has been disclosed a configuration including an unmanned aerial vehicle that automatically flies a designated sea route unmanned and transmits ocean monitoring information and information on a detected flight route in real time, a wireless network that wirelessly connects to the unmanned aerial vehicle in a cellular manner to communicate control signals and information in real time, a control station that connects to the wireless network to receive and manage information monitored by the unmanned aerial vehicle in real time and remotely control the flight route and information collection in real time, a database that connects to the control station to record information monitored and measured by the unmanned aerial vehicle, a web server that provides information recorded in the database by the control of the control station to the Internet in real time, an air network that provides a communication path for connecting to the control station, and a wireless controller that directly wirelessly connects to the unmanned aerial vehicle to control flight, takeoff, and landing.

Using this configuration, it is possible to monitor wide areas of the sea while ensuring the safety of professional technical workers, monitor changes in the marine environment in real time even in bad weather, monitor wide areas of the sea for a longer period of time at a low cost, remotely control an unmanned aerial vehicle anywhere in the country, and promptly receive monitored information.

However, since conventional systems like this require a large amount of money to build, and large and small ship accidents, such as the collision accident of the cargo ship (the Sea Grand) on the Gwangan Bridge in 2019, still occur at sea, there is a need for continuous measures to reduce such accidents.

RELATED ART DOCUMENTS

Patent Documents (Patent Document 1) Korean Patent Registration No. 10-2007849 (Jul. 31, 2019)

(Patent Document 2) Korean Patent Registration No. 10-2340589 (Dec. 14, 2021)

SUMMARY OF THE INVENTION

Embodiments of the present invention are directed to providing a drone device for ship navigation guidance and a driving method thereof that can acquire information of obstacles present on a planned sea route of a ship using, for example, a light detection and ranging (LiDAR) device mounted on a drone and provide the acquired information to the navigating ship in advance, can apply artificial intelligence (AI) to images of fishing buoys, marine litter, dangerous objects, or the like and classify the images through learning in order to determine the types of the obstacles, an expected movement path, or the like, and can analyze a marine environment such as a tidal current direction through statistical data or real-time data of regional tidal current and provide the analyzed marine environment to the ship.

A drone device for ship navigation guidance according to one embodiment of the present invention includes a data collector configured to collect data relating to a marine environment on a planned sea route along which a designated ship navigates, and a controller configured to perform learning of objects constituting the marine environment by applying an AI program, analyze the collected data based on a result of the learning to determine whether the objects are obstacles, and when the objects are determined as obstacles, further determine whether the obstacles are fixed obstacles or floating obstacles and send analysis data of a determined result to the ship to display the analysis data on a screen.

The data collector may collect data using a laser pulse characteristic of the LiDAR device.

The controller may perform learning of images relating to at least fishing buoys, marine litter, dangerous objects, and tidal current in advance in order to determine whether the objects are obstacles.

The controller may further analyze statistical data or real-time data of tidal current of an arbitrary region and use an analysis result to determine whether the objects are obstacles.

The controller may compare changes in coordinates of the obstacles and movement due to tidal current with the result of the learning in order to determine whether the obstacles are fixed obstacles or floating obstacles.

When an obstacle is a floating obstacle, the controller may generate a first piece of information relating to an expected movement path of the floating obstacle and provide the first piece of information to the ship, and when the floating obstacle is fixed, the controller may generate a second piece of information relating to an expected pattern under the sea and provide the second piece of information to the ship.

Also, a driving method of a drone device for ship navigation guidance according to one embodiment of the present invention includes an operation in which a data collector collects data relating to a marine environment on a planned sea route along which a designated ship navigates, and an operation in which a controller performs learning of objects constituting the marine environment by applying an AI program, analyzes the collected data based on a result of the learning to determine whether the objects are obstacles, and when the objects are determined as obstacles, further determines whether the obstacles are fixed obstacles or floating obstacles and sends analysis data of a determined result to the ship to display the analysis data on a screen.

The collecting operation may include collecting data using a laser pulse characteristic of a LiDAR device.

The learning operation may include learning images relating to at least fishing buoys, marine litter, dangerous objects, and tidal current in advance in order to determine whether the objects are obstacles.

The operation of determining whether the objects are obstacles may include further analyzing statistical data or real-time data of tidal current of an arbitrary region and using an analysis result to determine whether the objects are obstacles.

The operation of determining whether the obstacles are fixed obstacles or floating obstacles may include comparing changes in coordinates of the obstacles and movement due to tidal current with the result of the learning.

The driving method may further include an operation of, when an obstacle is a floating obstacle, generating a first piece of information relating to an expected movement path of the floating obstacle and providing the first piece of information to the ship, and an operation of, when the floating obstacle is fixed, generating a second piece of information relating to an expected pattern under the sea and provide the second piece of information to the ship.

According to an embodiment of the present invention, since direct communication is possible between a ship and a drone that observes the marine environment (for example, buoys, marine litter, dangerous objects, tidal current, and the like) of a sea route along which the ship is about to navigate, costs associated with building a system of the conventional control station can be saved.

Also, according to an embodiment of the present invention, by guiding a ship when the ship navigates an unfamiliar sea route or when the marine environment changes suddenly (for example, due to buoys or the like), safe operation of the ship is possible even in sudden environmental changes.

DETAILED DESCRIPTION OF THE INVENTION

Hereinafter, embodiments of the present invention will be described in detail with reference to the accompanying drawings.

Figure 1:
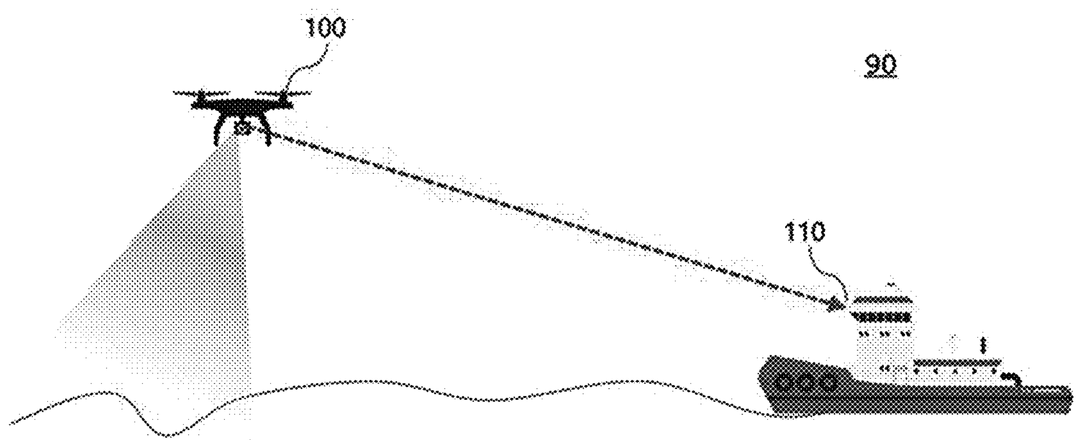
FIG. 1 is a view illustrating a drone light detection and ranging (LiDAR) artificial intelligence (AI) system according to an embodiment of the present invention.
Figure 2:
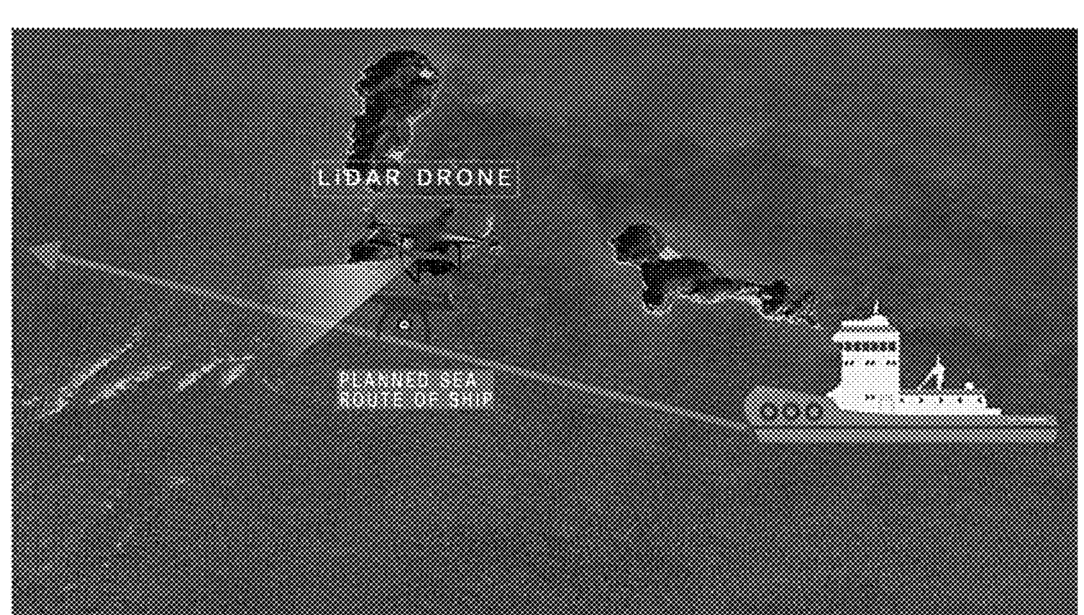
FIGS. 2 to 4 are views for describing a process in which a drone device of FIG. 1 guides a planned sea route of a ship.
Figure 3:
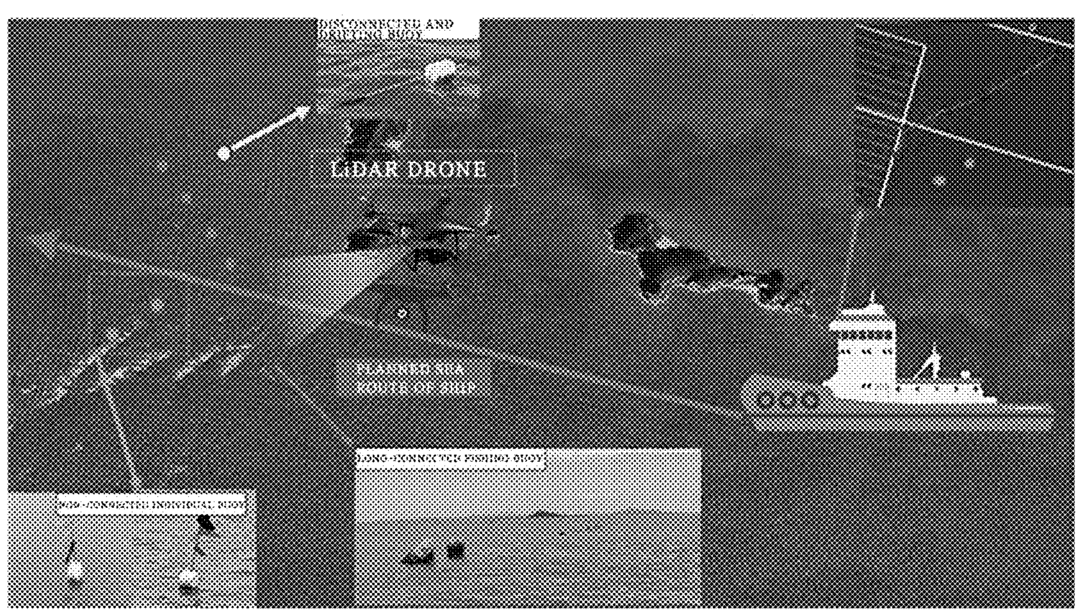
Figure 4:
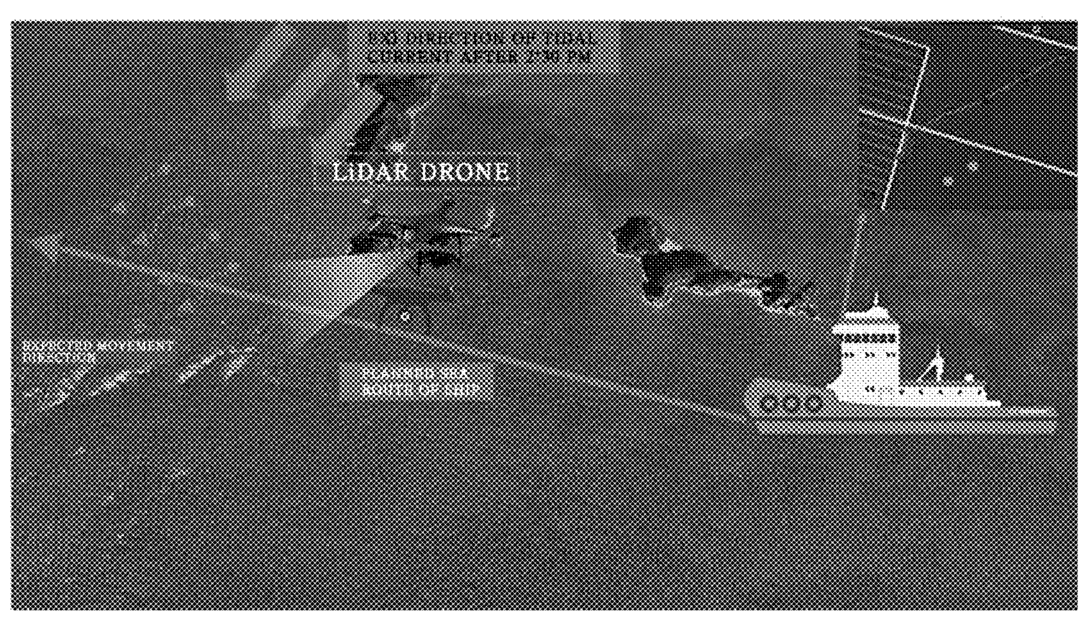

FIG. 1 is a view illustrating a drone light detection and ranging (LiDAR) artificial intelligence (AI) system according to an embodiment of the present invention, and FIGS. 2 to 4 are views for describing a process in which a drone device of FIG. 1 guides a planned sea route of a ship.

As illustrated in FIG. 1, a drone LiDAR AI system 90 according to an embodiment of the present invention may include some or all of a drone device (or unmanned aerial vehicle) 100, a ship electronic device 110, a control device of a control center, a communication network, a Global Positioning System (GPS) device, and the like.

Here, "include some or all" means that the control device, the communication network, the GPS device, or the like may be omitted and the drone device 100 and the ship electronic device 110 may perform direct communication (for example, peer-to-peer (P2P) or the like), or some of the components constituting the drone device 100 may be configured to be integrated with the control device. In an embodiment of the present invention, for easy understanding of the invention, the case in which the drone device 100 and the ship electronic device 110 perform direct communication will be described.

For example, the drone device 100 according to an embodiment of the present invention may be directly held on a ship sailing the sea and operated to assist with navigation in any territorial waters. Alternatively, the drone device 100 may be held somewhere such as a marine control station, and if guidance is required through communication with a ship when the ship enters the territorial waters of a specific country, the drone device 100 may fly to the corresponding ship by control of a control device and perform a guidance operation. In this way, the drone device 100 may be used in various situations. Therefore, the drone device 100 is not specifically limited to any one form.

The drone device 100 according to an embodiment of the present invention may use the LiDAR (device) and provide information on obstacles present on a planned sea route of a ship, for example, the types of the obstacles, movement coordinates of the obstacles or the like, an expected movement path (of tidal current), and the like, to the navigating ship in advance. For example, when flying the drone device 100 from a ship, data relating to the ship's planned sea route may be pre-stored in the drone device 100. Therefore, the drone device 100 may be seen as collecting various environmental information at sea while flying based on the corresponding data. To this end, the LiDAR device may be used. Of course, since the drone device 100 may use, for example, GPS coordinate values based on the ship's planned sea route data in relation to the flight path, the drone device 100 may fly along the corresponding sea route through an inertial navigation device such as a gyro sensor or an acceleration sensor embedded therein, or the drone device 100 may have a GPS module embedded therein and collect environmental information relating to the marine environment, that is, the underwater environment, while flying along a sea route through communication with a GPS satellite. Of course, the drone device 100 may have a camera embedded therein in addition to a LiDAR device and may capture an image of a sea surface.

The LiDAR device is a device that emits laser pulses, receives light reflected from around a target object, and measures a distance to the object to precisely draw the view around the object. In addition to being used to measure the distance to the target object, the LiDAR device may be used to measure the moving speed and direction and temperature, perform analysis of surrounding atmospheric substances, and measure concentrations thereof. The LiDAR device may be used for weather observation due to being able to detect non-metallic rocks, clouds, raindrops, aerosols, or the like using ultraviolet rays, visible light, near infrared rays, or the like, may be used to precisely draw a topographic map, may be used to guide landing of an aerial vehicle or recognize the surroundings of an autonomous vehicle, or may be used to find the chemical composition of gases mixed in the air by using the phenomenon that a wavelength of easily scattered light is different for each molecule.

The LiDAR device according to an embodiment of the present invention may include a sensor configured to acquire information necessary to implement a three-dimensional image. When the LiDAR device is mounted on an aircraft, that is, the drone device 100, and, while flying, measures the time it takes for a laser pulse emitted to the ground surface to return in order to analyze a spatial position of a reflection point to perform topographic surveying, since the time it takes for the laser pulse to return after being reflected varies according to the structure, a three-dimensional model that is difficult to obtain with optical images can be obtained. A ground LiDAR device may combine the three-dimensional model with position coordinates obtained with the GPS and may obtain precise data.

The LiDAR device according to an embodiment of the present invention may be configured using a laser (generator), a scanner, a receiver, and a position checking system. The laser has different wavelengths according to purpose and generally uses light having a wavelength ranging from 600 to 1,000 nm. However, light in a longer wavelength band may be used to reduce damage to human eyes. The scanner is a part that quickly scans the surroundings to obtain information. To this end, various types of mirrors may be applied and used. The receiver is a part that detects the returning light, and the sensitivity of the receiver to light is a major factor that determines the performance of the LiDAR device. The receiver serves to detect and amplify photons. The position checking system is a part that checks the coordinates and direction of the position of the receiver in order to implement a three-dimensional image, for example.

In order to determine the type of obstacle or an expected movement path, the drone device 100 may perform learning of images of fishing buoys, marine litter, dangerous objects, and the like in advance using an AI program embedded therein, distinguish obstacles or the like based on a result of the learning, and in this process, analyze data through statistical data or real-time data of tidal current of a region provided from a related agency, for example, the Ministry of Maritime Affairs and Fisheries or the Office of Oceans and Fisheries, and send an analysis result to the ship, more accurately, the ship electronic device 110. The analysis data of the statistical data or real-time data of tidal current may be used to more accurately determine a direction of tidal current. Here, since the ship electronic device 110 includes a monitor or the like, the analysis result may be displayed on the corresponding screen. The drone device 100 performs learning of obstacles in the marine environment through images of fishing buoys, marine litter, dangerous objects, or the like by applying the AI program. Also, the drone device 100 may, based on a result of the learning, analyze data acquired during the current flight and may determine the type, expected movement path, or the like of an obstacle, more accurately, a marine object. There are various learning methods for AI, such as supervised learning, unsupervised learning, and semi-supervised learning combining the two, and at least one learning method may be used in an embodiment of the present invention.

Also, for example, in order to check whether an obstacle is a fixed obstacle or a floating obstacle, the drone device 100 may classify the obstacle through an AI program by using changes in coordinates of the obstacle, movement of the obstacle due to tidal current, or an image of the obstacle and provide a picture together, and when the obstacle is a floating obstacle, the drone device 100 may provide information on an expected movement path of the floating obstacle to the ship, and when the floating obstacle is fixed, the drone device 100 may provide information, that is, data, relating to an expected pattern under the sea to the ship. When the floating obstacle is fixed, the drone device 100 may use AI to determine whether the ship is able to navigate along the route, that is, the corresponding path.

The ship electronic device 110 may include various types of devices provided in a ship. Although various equipment such as a voyage data recorder (VDR), an automatic identification system (AIS) of ships, and an anti-pirate system may be included in the ship electronic device 110, in an embodiment of the present invention, for example, a communication device for direct communication with the drone device 100, a monitor, that is, an image display device that can display data provided from the drone device 100 on a screen, and the like may be included in the ship electronic device 110. For example, when there is no problem on a planned sea route pre-generated based on data received from the drone device 100, the ship may navigate along the planned sea route. However, a sea route may be changed when an obstacle is detected from the planned sea route based on the data provided from the drone device 100. In other words, an initially set planned sea route may be reset. Of course, the monitor constituting the ship electronic device 110 may perform various operations such as displaying the changed planned sea route on a screen, displaying information on an obstacle together on the screen when the planned sea route is changed, or displaying a captured image of the obstacle together on the screen when the planned sea route is changed.

The drone device 100 and the ship electronic device 110 of FIG. 1 may perform various operations other than those described above, and since the related content may be covered below, the following content may be referenced for various other operations.

Figure 5:
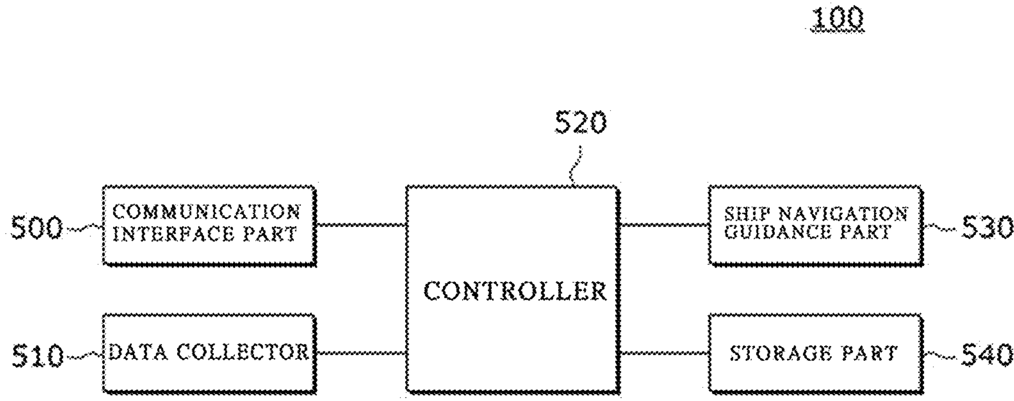
FIG. 5 is a block diagram illustrating a detailed structure of the drone device of FIG. 1.

FIG. 5 is a block diagram illustrating a detailed structure of the drone device of FIG. 1.

As illustrated in FIG. 5, the unmanned aerial vehicle, that is, the drone device 100, according to an embodiment of the present invention includes some or all of a communication interface part 500, a data collector 510, a controller 520, a ship navigation guidance part 530, and a storage part 540.

Here, "includes some or all" means that the drone device 100 may be configured by omitting some components such as the storage part 540, or some components such as the ship navigation guidance part 530 may be configured to be integrated with other components such as the controller 520.

To help sufficient understanding of the invention, the case in which the drone device 100 includes all the components will be described.

The communication interface part 500 may communicate with the ship electronic device 110, that is, a communication device, provided in the ship of FIG. 1. The communication interface part 500 may send an analysis result of data relating to the marine environment (for example, the type of obstacle, whether the obstacle is a fixed obstacle or a floating obstacle, or the like) collected through the data collector 510 to the ship. Of course, the communication interface part 500 may provide the analysis data to the ship by short range communication such as Wi-Fi through which bidirectional communication is possible.

Of course, the communication interface part 500 is able to process data using a GPS navigation device, that is, a satellite, other than direct communication according to an embodiment of the present invention, and thus the communication interface part 500 is not specifically limited to performing direct communication in the embodiment of the present invention. However, when the drone device 100 of FIG. 1 is an aerial vehicle provided in a ship, processing data using direct communication may be preferable. This is because, for example, GPS communication may be impossible for middle- to low-price drone devices 100.

The communication interface part 500 may perform operations such as modulating/demodulating and multiplexing/demultiplexing in order to send data processed by the drone device 100 to the ship, and since such operations are self-evident to those of ordinary skill in the art, further description thereof will be omitted. For example, the communication interface part 500 may perform an encrypting/decrypting operation for safe protection of data being sent. For example, the drone device 100 may send data in an encrypted form, and the ship electronic device 110 may decrypt the corresponding encrypted data to use the data.

The data collector 510 may be configured to include a LiDAR (device) or the like. Of course, the data collector 510 may also include a camera in addition to the LiDAR device. The camera may capture an image of a buoy floating on the sea surface or a state of tidal current. Also, the LiDAR device may be used to analyze the environment under the sea. The LiDAR device may generate laser and emit laser into the sea while flying along a planned sea route along which a ship is about to navigate and may collect and analyze laser reflected from various objects under the sea to understand the environment under the sea. In this process, the data collector 510 may generate a three-dimensional image based on the corresponding data (for example, using depth data or the like). Of course, the data collector 510 may collect data of reflected laser through a scanner and transmit the collected data to the controller 520. Image data relating to captured images captured by the camera may also be provided to the controller 520.

Also, the data collector 510 may perform an operation for generating coordinate information of the corresponding position when collecting data. For example, the data collector 510 may generate coordinate information using a gyro sensor, an acceleration sensor, or the like or may generate coordinate information of the corresponding position by communication with a GPS navigation device. Above all, it is preferable for the drone device 100 to generate coordinate information of obstacles rather than its own position, and to this end, the drone device 100 may measure a distance or direction between two points by utilizing its own position information and generate coordinate information of obstacles based on the measured distance or direction. Since position information, that is, coordinate information, relating to various types of objects included in collected data may be generated in various ways during data collection, the generating method is not specifically limited to any one form in the embodiment of the present invention.

The controller 520 is in charge of the overall control of the communication interface part 500, the data collector 510, the ship navigation guidance part 530, and the storage part 540 of FIG. 5. The controller 520 may temporarily store data collected through the data collector 510, for example, the collected (or scanned) data provided from the scanner constituting the LiDAR device and the image data relating to images captured by the camera, in the storage part 540, load the data, and then provide the data to the ship navigation guidance part 530 to request analysis of the data. Of course, in this process, the controller 520 may provide position information generated by communication with the GPS navigation device, that is, coordinate information of the drone device 100, more accurately, coordinate information of obstacles, together to the ship navigation guidance part 530.

Also, the controller 520 may control communication of the communication interface part 500 to send an analysis result obtained by analysis in the ship navigation guidance part 530, that is, analysis data relating to a pre-generated planned sea route, to the ship electronic device 110 of the ship. That is, the controller 520 may control a direct communication module to send the corresponding data. Since the ship electronic device 110 of the ship that communicates with the drone device 100 performs communication according to a designated communication protocol, the controller 520 processes data according to the corresponding communication protocol and sends the data to the ship. Of course, for communication, the drone device 100 and the ship electronic device 110 of the ship may automatically allow communication when a signal relating to a product or model of a specific manufacturer is detected from the other or may have device identification information of devices that are able to communicate pre-registered therein and then allow communication based on the pre-registered device identification information.

The ship navigation guidance part 530 may, by communicating with a ship, receive sea route data relating to a planned sea route along which the corresponding ship is about to navigate, analyze the received sea route data, and request the controller 520 for the drone device 100 to fly according to the analyzed sea route data. Since the data relating to the planned sea route of the ship can be acquired in various ways, the acquisition method is not specifically limited to any one form in the embodiment of the present invention. For example, when the drone device 100 is directly possessed and managed by the ship, before flying the drone device 100, the data of the pre-generated planned sea route of the ship may be provided to the drone device 100 through a storage medium, or the data may be provided by being written in a memory (for example, an electrically erasable programmable read-only memory (EEPROM) or the like) through a computer or the like.

The ship navigation guidance part 530 may also perform an operation for changing the data of the pre-generated planned sea route of the ship. To this end, the ship navigation guidance part 530 may analyze data collected and provided by the data collector 510, and in this process, apply an AI program to increase accuracy of data analysis. In other words, the marine environment may include various objects on the sea surface and under the sea. Typical examples of the objects may include buoys floating on the sea, tidal current, marine litter, and dangerous objects. Also, a fixed floating obstacle (for example, a fishing ground or the like) may be included under the sea. Rocks may be present under the sea. The ship navigation guidance part 530 utilizes an AI program to perform learning of the marine environment including such various objects in advance through image analysis or the like and analyzes the collected data based on a result of the learning.

More specifically, the ship navigation guidance part 530 may determine the type of obstacle from the collected data based on the learning data, and in this process, further utilize a result of analyzing statistical data or real-time data of tidal current of a region where the ship navigates. Of course, the ship navigation guidance part 530 may also perform learning of the statistical data or real-time data. Alternatively, the corresponding statistical data may be referred to in a final decision stage. Tidal current is a typical example of such data. The type of obstacle may be determined as above, a difference value from the pre-generated planned sea route of the ship may be derived based on a result of the determination, and the difference value may be provided to the ship. Further, the ship navigation guidance part 530 may check whether an obstacle is a fixed obstacle or a floating obstacle, and to this end, classify the obstacle using AI through changes in coordinates of the obstacle, movement of the obstacle due to tidal current, or an image of the obstacle and provide a picture together (to the ship). When the obstacle is a floating obstacle, information on an expected movement path of the floating obstacle may be generated and provided, and when the floating obstacle is fixed, an expected pattern under the sea may be generated and provided. That is, whether navigation along the (planned) sea route is possible may be determined through AI, and a result thereof may be provided. The ship navigation guidance part 530 may use the same map as the ship, display a sea route on map data, and process data relating thereto. This is shown well in FIGS. 3 and 4. For example, a map may have numerous invisible or visible grid patterns, and each grid pattern may match and pre-store coordinate values of the latitude/longitude or the like or may display the coordinate values on the screen. Therefore, a planned path or a changed path may be displayed on the map based on the corresponding coordinate values.

The storage part 540 stores various types of information or data processed under control of the controller 520. The storage part 540 may temporarily store data provided by the data collector 510, load the data, and then provide the data to the ship navigation guidance part 530 for analysis of the data. Also, the storage part 540 may pre-store data relating to a planned sea route of the ship and then provide the pre-stored data when there is a request from the ship navigation guidance part 530. The ship navigation guidance part 530 may predict an expected movement direction based on the data of the corresponding planned sea route of the ship and provide the expected movement direction to the ship.

The communication interface part 500, the data collector 510, the controller 520, the ship navigation guidance part 530, and the storage part 540 of FIG. 5 may perform various operations other than those described above, and since other details have been sufficiently described above, the details may be referenced for those operations.

Although the communication interface part 500, the data collector 510, the controller 520, the ship navigation guidance part 530, and the storage part 540 of FIG. 5 according to an embodiment of the present invention are configured as hardware modules physically separated from each other, each module may store software for performing the above-described operations therein and run the software. However, since the corresponding software is a set of software modules, and each module may be formed as hardware, the above components are not specifically limited to the software or hardware configuration. For example, the storage part 540 may be a storage or a memory which is hardware. However, since the storage part 540 may also be a repository in the form of software that stores information, the present invention is not specifically limited to the above content.

Meanwhile, in another embodiment of the present invention, the controller 520 may include a central processing unit (CPU) and a memory and may be formed in the form of one chip. The CPU may include a control circuit, an arithmetic logic unit (ALU), a command interpretation unit, a registry, and the like, and the memory may include a random-access memory (RAM). The control circuit may perform a control operation, the ALU may perform an arithmetic/logic operation of binary bit information, the command interpretation unit may include an interpreter, a compiler, or the like and perform an operation of converting a high-level language into a machine language or a machine language into a high-level language, and the registry may be involved in data storage in terms of software. According to the above configuration, for example, a program stored in the ship navigation guidance part 530 may be copied and loaded to the memory, that is, the RAM, and then run at an initial stage of operation of the drone device 100 to rapidly increase the data processing speed. A deep learning model may be loaded to a graphics processing unit (GPU) memory instead of the RAM and may be run by accelerating the performance speed using a GPU.

Figure 6:
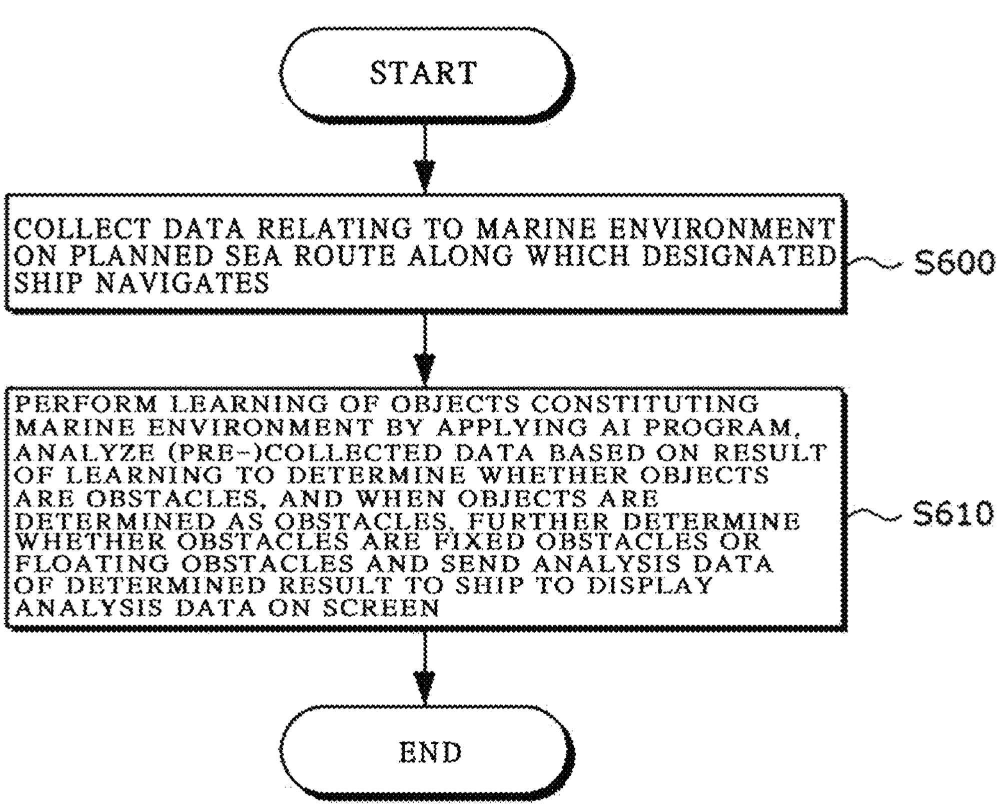
FIG. 6 is a flowchart illustrating a driving process of the drone device of FIG. 1.

FIG. 6 is a flowchart illustrating a driving process of the drone device of FIG. 1.

Referring to FIG. 6 along with FIG. 1 for convenience of description, the drone device 100 of FIG. 1 according to an embodiment of the present invention collects data relating to the marine environment (for example, buoys, tidal current, marine litter, dangerous objects, and the like) on a planned sea route along which a designated (or an arbitrary) ship navigates (S600). In order to collect data, the drone device 100 may have a LiDAR device embedded therein and further have an image capturing device such as a camera embedded therein. Also, the drone device 100 may include a GPS module for communication with a GPS navigation device or may include a gyro or acceleration sensor therein, and in this way, may generate position information and generate coordinate information relating to the positions of buoys or dangerous objects. For example, latitude/longitude information may be used as the coordinate information.

Also, the drone device 100 may perform learning of objects constituting the marine environment (for example, buoys, marine litter, dangerous objects such as rocks, and the like) by applying an AI program, analyze the (pre-) collected data based on a result of the learning to determine whether the objects are obstacles, and when the objects are determined as obstacles, further determine whether the obstacles are fixed obstacles or floating obstacles and send analysis data (according to determination) to the ship (S610). The analysis data is displayed on a screen of a monitor configured in the ship. The displayed analysis data may be checked by the captain of the ship or other related personnel.

The drone device 100 according to an embodiment of the present invention may increase accuracy of analyzing the objects of the marine environment by utilizing the AI program. Also, the drone device 100 may generate data relating to a changed sea route of an initially planned sea route of the ship based on various determination results and send the generated data to the ship. Of course, a direction of the change may be provided in the form of coordinate values on the map, and the drone device 100 and the ship may use the same map, and in this way, utilize unified coordinate values. Therefore, since the drone device 100 and the ship use the same map, the ship may receive information on coordinate values of an expected movement direction of tidal current or a changed sea route provided by the drone device 100 and may, based on the received information, display a sea route changed from an initially set planned sea route of the ship on the monitor.

The drone device 100 and the ship electronic device 110 of FIG. 1 may perform various operations other than those described above, and since other details have been sufficiently described above, the details may be referenced for those operations.

Even when all components constituting an embodiment of the present invention are described as being combined into one component or operating in a combined form, the present invention is not necessarily limited to such an embodiment. That is, one or more of the components may be selectively combined and operate within the target scope of the present invention. Also, although each component may be implemented using single independent hardware, some or all of the components may be selectively combined and implemented as a computer program having a program module performing some or all functions combined from one or multiple pieces of hardware. Codes and code segments constituting the computer program may be easily inferred by those of ordinary skill in the art of the present invention. The computer program may be stored in non-transitory computer readable media and read and run by the computer to implement the embodiment of the present invention.

Here, the non-transitory readable recording media are media that semi-permanently store data and are readable by devices instead of media that store data for a short period of time such as a register, a cache, or a memory. Specifically, the programs described above may be provided by being stored in non-transitory readable recording media such as a compact disc (CD), a digital versatile disc (DVD), a hard disk, a Blu-ray disc, a Universal Serial Bus (USB), a memory card, or a read only memory (ROM).

Embodiments of the present invention have been described above with reference to the accompanying drawings, but those of ordinary skill in the art to which the present invention pertains should understand that the present invention may be embodied in other specific forms without changing the technical spirit or essential features of the present invention. Therefore, the embodiments described above should be understood as illustrative, instead of limiting, in all aspects.

[Description of Reference Numerals]

| | |
|---|---|
| 100: drone device (or unmanned aerial vehicle) | 110: ship electronic device |
| 500: communication interface part | 510: data collector |
| 520: controller | 530: ship navigation guidance part |
| 540: storage part | |

The invention claimed is:

1. A drone device for ship navigation guidance, the drone device comprising:

a data collector configured to collect data relating to a marine environment on a planned sea route along which a designated ship navigates, wherein the data collector includes a LiDAR device mounted on the drone device and a camera mounted on the drone device, the LiDAR device is configured to emit a laser pulse and receive light reflected from a target object while the drone device autonomously flies along the planned sea route through one of an inertial navigation device including a gyro sensor or an acceleration sensor embedded in the drone device and a GPS module embedded in the drone device, and the camera is configured to capture an image of a buoy floating on a sea surface or a state of tidal current; and a controller configured to perform learning of objects constituting the marine environment by applying an artificial intelligence program, wherein the artificial intelligence program is pre-trained on images of fishing buoys, marine litter, dangerous objects, and tidal current, analyze the collected data based on a result of the learning to determine whether the objects are obstacles, and when the objects are determined as obstacles, further determine whether the obstacles are fixed obstacles or floating obstacles, and send analysis data of a determined result to the designated ship to display the analysis data on a screen of a ship electronic device of the designated ship via direct peer-to-peer communication between the drone device and the ship electronic device, wherein the controller compares changes in coordinates of the obstacles and movement of the obstacles due to tidal current with the result of the learning, and further analyzes statistical data and real-time data of tidal current of an arbitrary region provided from a related agency, in order to determine whether the obstacles are the fixed obstacles or the floating obstacles, wherein the controller is further configured to generate coordinate information of the obstacles by measuring a distance or a direction between two points using position information of the drone device, the position information of the drone device being generated by the inertial navigation device or the GPS module embedded in the drone device, when an obstacle is a floating obstacle, the controller generates a first piece of information relating to an expected movement path of the floating obstacle and provides the first piece of information to the designated ship via the direct peer-to-peer communication, when the floating obstacle is fixed, the controller generates a second piece of information relating to an expected pattern under the sea and provides the second piece of information to the designated ship via the direct peer-to-peer communication, and wherein the controller is further configured to derive a difference value from the planned sea route of the designated ship based on a result of a determination of a type of an obstacle, change data of the planned sea route of the designated ship based on the difference value, and provide the difference value and changed data of the planned sea route to the designated ship via the direct peer-to-peer communication, such that the ship electronic device resets the planned sea route based on the analysis data, the difference value, and the changed data of the planned sea route provided from the drone device, and displays a changed planned sea route on the screen of the ship electronic device, wherein the designated ship changes a route of the designated ship based on the changed data of the planned sea route provided from the drone device.

2. The drone device of claim 1, wherein the LiDAR device measures a distance to an obstacle of the obstacles based on a time it takes for the laser pulse to return after being reflected at a surface of the obstacle, and obtains a three-dimensional model of the obstacle including height information of the obstacle.

3. A driving method of a drone device for ship navigation guidance, the driving method comprising:

an operation in which a data collector collects data relating to a marine environment on a planned sea route along which a designated ship navigates, wherein the data collector includes a LiDAR device mounted on the drone device and a camera mounted on the drone device, the LIDAR device emits a laser pulse and receives light reflected from a target object while the drone device autonomously flies along the planned sea route through one of an inertial navigation device including a gyro sensor or an acceleration sensor embedded in the drone device and a GPS module embedded in the drone device, and the camera captures an image of a buoy floating on a sea surface or a state of tidal current;

an operation in which a controller performs learning of objects constituting the marine environment by applying an artificial intelligence program, wherein the artificial intelligence program is pre-trained on images of fishing buoys, marine litter, dangerous objects, and tidal current;

an operation in which the controller analyzes the collected data based on a result of the learning to determine whether the objects are obstacles, and when the objects are determined as obstacles, further determines whether the obstacles are fixed obstacles or floating obstacles; and an operation in which the controller sends analysis data of a determined result to the designated ship to display the analysis data on a screen of a ship electronic device of the designated ship via direct peer-to-peer communication between the drone device and the ship electronic device, wherein the operation of further determining whether the obstacles are the fixed obstacles or the floating obstacles includes comparing changes in coordinates of the obstacles and movement of the obstacles due to tidal current with the result of the learning, and further analyzing statistical data and real-time data of tidal current of an arbitrary region provided from a related agency, wherein the driving method further comprises an operation in which the controller generates coordinate information of the obstacles by measuring a distance or a direction between two points using position information of the drone device, the position information of the drone device being generated by the inertial navigation device or the GPS module embedded in the drone device, when an obstacle is a floating obstacle, the controller generates a first piece of information relating to an expected movement path of the floating obstacle and provides the first piece of information to the designated ship via the direct peer-to-peer communication, when the floating obstacle is fixed, the controller generates a second piece of information relating to an expected pattern under the sea and provides the second piece of information to the designated ship via the direct peer-to-peer communication, and wherein the driving method further comprises an operation in which the controller derives a difference value from the planned sea route of the designated ship based on a result of a determination of a type of an obstacle, changes data of the planned sea route of the designated ship based on the difference value, and provides the difference value and changed data of the planned sea route to the designated ship via the direct peer-to-peer communication, such that the ship electronic device resets the planned sea route based on the analysis data, the difference value, and the changed data of the planned sea route provided from the drone device, and displays a changed planned sea route on the screen of the ship electronic device, wherein the designated ship changes a route of the designated ship based on the changed data of the planned sea route provided from the drone device.

4. The driving method of claim 3, wherein the LiDAR device measures a distance to an obstacle of the obstacles based on a time it takes for the laser pulse to return after being reflected at a surface of the obstacle, and obtains a three-dimensional model of the obstacle including height information of the obstacle.

* * * * *